United States Patent [19]
Coles et al.

[11] Patent Number: 6,030,471
[45] Date of Patent: Feb. 29, 2000

[54] METHOD FOR PRODUCING A HARDENED WHEEL

[75] Inventors: Kelly S. Coles, New Berlin; Steven J. Brahm, Muskego, both of Wis.

[73] Assignee: MHE Technologies, Inc., Wilmington, Del.

[21] Appl. No.: 09/201,367

[22] Filed: Nov. 30, 1998

[51] Int. Cl.[7] ................................. C21D 9/32
[52] U.S. Cl. .................. 148/583; 148/574; 148/575; 148/644
[58] Field of Search .................... 148/644, 574, 148/575, 583

[56] References Cited

U.S. PATENT DOCUMENTS

| | | |
|---|---|---|
| 922,655 | 5/1909 | Wolle . |
| 1,383,963 | 7/1921 | Mordey . |
| 1,391,907 | 9/1921 | Schaffer . |
| 1,527,418 | 2/1925 | Laughlin . |
| 1,687,656 | 10/1928 | Brown . |
| 2,103,716 | 12/1937 | Frickey ............................ 148/10 |
| 2,188,569 | 1/1940 | Endsley ........................... 148/10 |
| 2,265,275 | 12/1941 | Endsley ........................... 148/10 |
| 2,470,311 | 5/1949 | Hoyler et al. .................... 198/209 |
| 2,495,193 | 1/1950 | Wells ............................... 219/13 |
| 2,535,110 | 12/1950 | Wishart ......................... 148/21.55 |
| 3,385,583 | 5/1968 | Jablonski ........................... 266/4 |
| 3,460,815 | 8/1969 | Corteggiano ...................... 266/4 |
| 3,532,333 | 10/1970 | Dehn ................................. 2666/4 |
| 4,201,602 | 5/1980 | Shupe ............................. 148/146 |
| 5,056,671 | 10/1991 | Thorsen .......................... 212/147 |

*Primary Examiner*—Deborah Yee
*Attorney, Agent, or Firm*—Michael Best & Friedrich LLP

[57] ABSTRACT

A specialized induction facility provides localized heating in only the desired wear areas of a crane wheel while leaving the supporting material "as-forged" and ductile. The wear area of a crane wheel is hardened such that flanges extending out from a working tread surface are not completely through hardened.

29 Claims, 6 Drawing Sheets

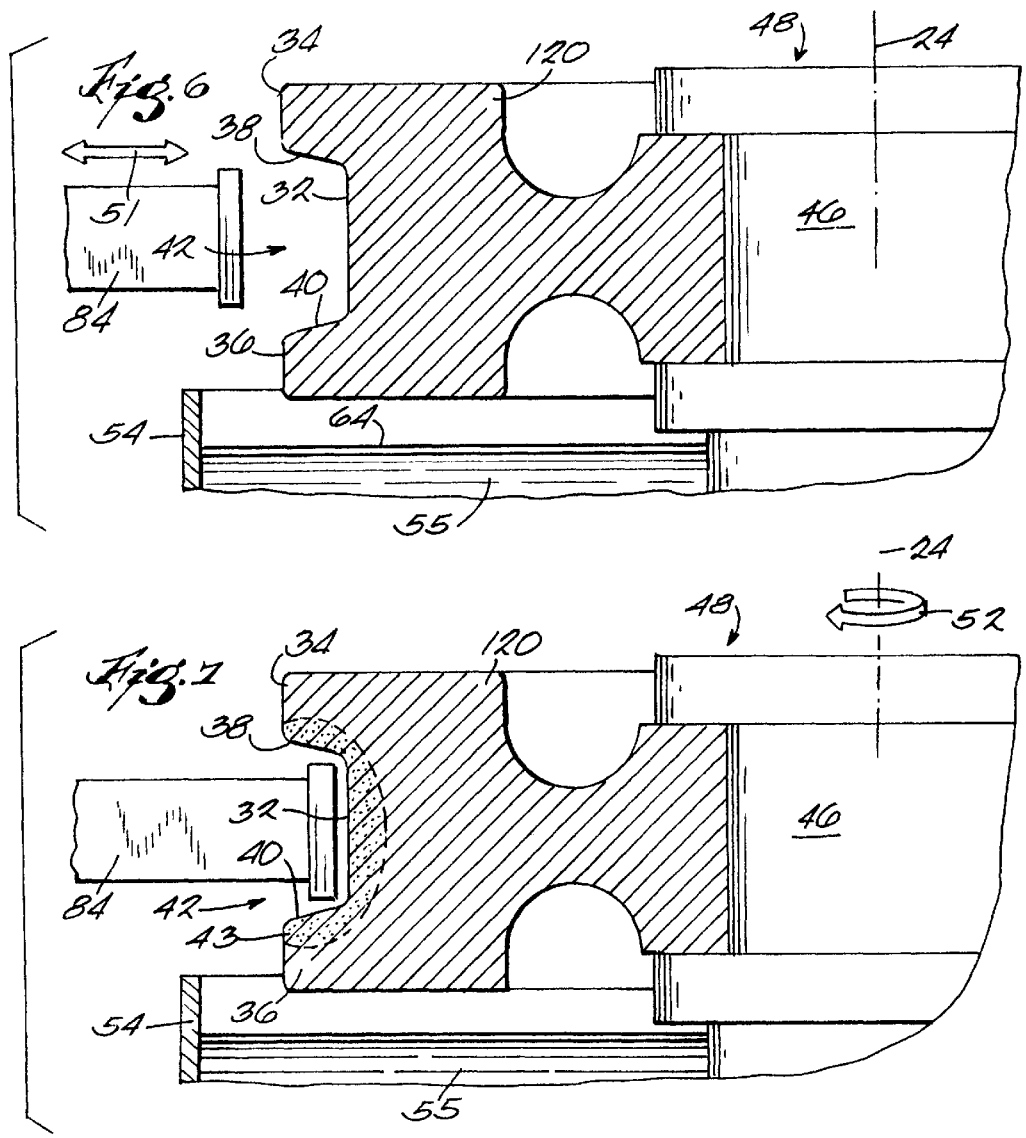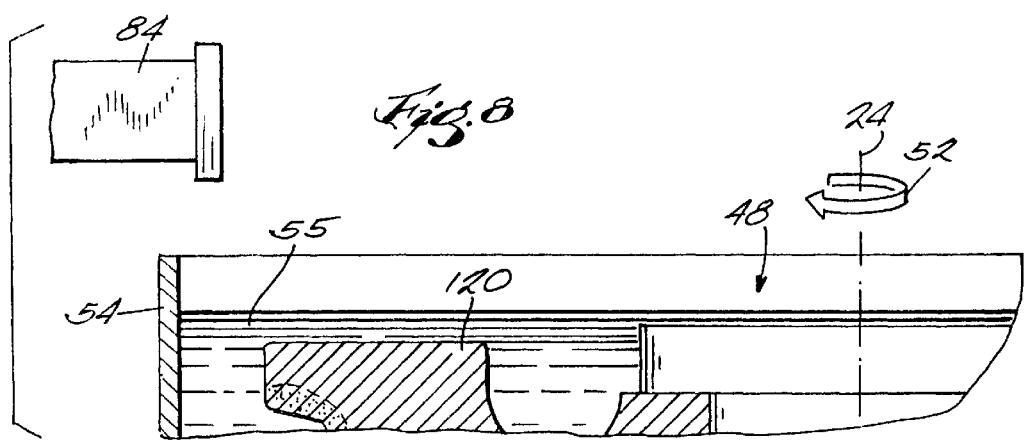

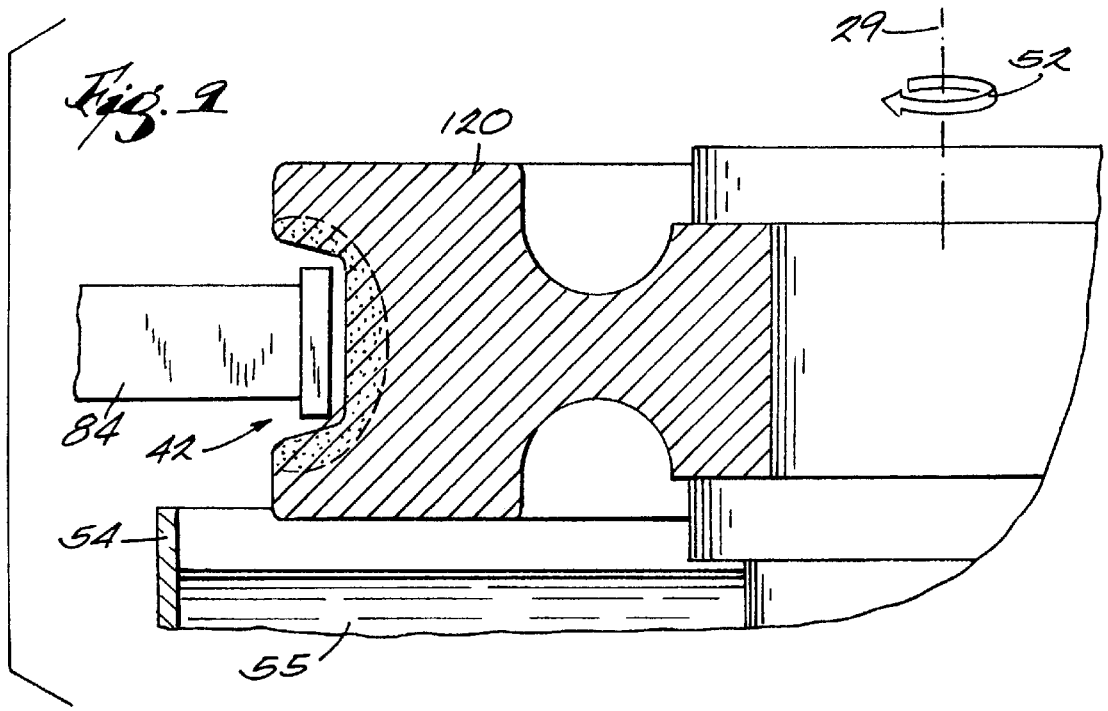
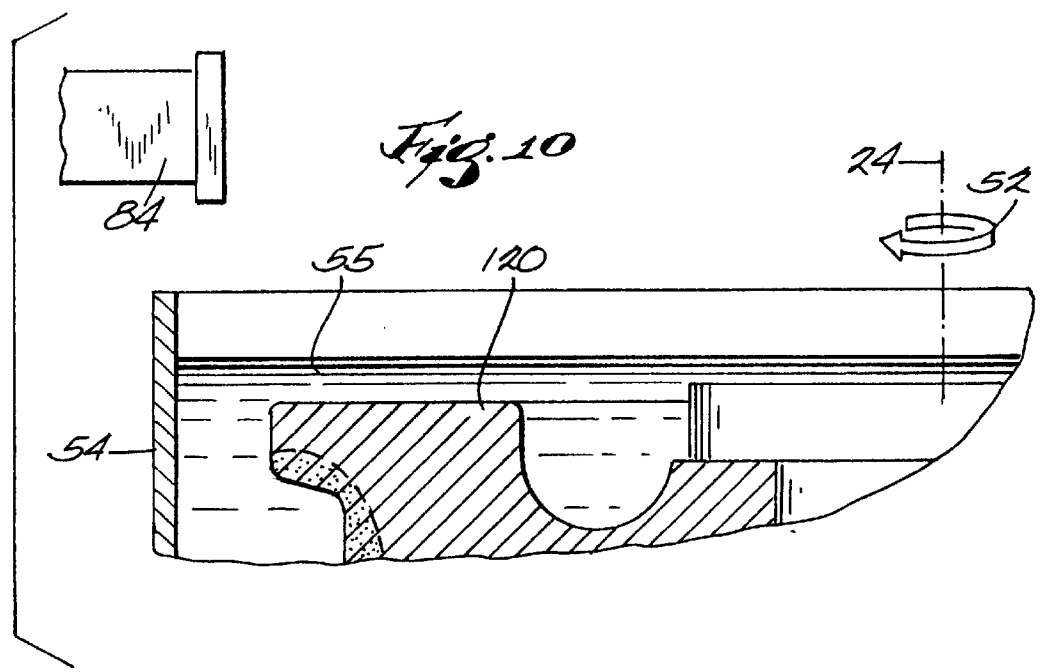

METHOD FOR PRODUCING A HARDENED WHEEL

FIELD OF THE INVENTION

The present invention relates, generally, to wheels for use in overhead crane assemblies, pulley systems, or the like. More particularly, the present invention concerns crane wheels which travel along a rail in an overhead crane assembly. Specifically, the present invention pertains to case hardened crane wheels with improved wear characteristics and toughness

BACKGROUND OF THE INVENTION

Overhead cranes which travel on wheels along spaced apart, generally parallel rails, are subject to the continuous problem of crane wheel wear and failure. In such overhead cranes, wheels roll along a rail surface such that a portion of a crane wheel comes into contact with the rail surface thereby subjecting that portion of the crane wheel to wear.

A typical prior art crane wheel 20 is shown in FIGS. 1 and 2. The crane wheel 20 includes a hub 22 which surrounds an axis of rotation 24 of the crane wheel 20. The hub 22 is part of a radially inner portion 26 which consists of a body or core material 28 of the wheel 20. The crane wheel 20 further includes a radially outer portion 30 which includes a working tread surface 32 and opposing outer flanges 34, 36 which have respective inner surfaces 38, 40. The working tread surface 32 and at least portions of the flange inner surfaces 38, 40 make up a wear area 42 of the crane wheel 20.

As can be appreciated by those skilled in the art, certain portions of a crane wheel need different physical characteristics as compared to other portions of the crane wheel. The different physical properties are necessary because of the different conditions encountered by the different parts of the crane wheel as the crane wheel is in service. The wear area that engages a rail of an overhead crane must be resistant to wear. Thus, this portion of the wheel should be hardened. The hub of the wheel may be machined after heat treating of the wheel for the reception of an axle and of various bearing members in a crane assembly. Thus, this portion of the wheel should preferably remain machinable after heat treating of the wheel. As a result, for these types of wheels, processes have been used in an attempt to harden areas subjected to wear while attempting to maintain other areas of the wheel ductile or, as-forged.

Two prior processes used to harden wear surfaces of a crane wheel and which are capable of providing the necessary surface hardness required to support and guide heavy crane wheel loads, are generally known as the salt bath process and the gas carburizing process.

The salt bath process involves heating the surface temperature of a crane wheel to roughly about 1650° F. by immersing the entire wheel or part of the wheel into a molten salt bath. When immersing only part of the wheel at any given time, the wheel is usually mounted on a rotating member such that the flanges, working tread surface and part of the body come into contact with the salt bath as the wheel is rotated. The heating process takes from one to three hours depending on the size of the crane wheel. Once the desired temperature is reached, the wheel is removed from the molten salt bath and transported to a quench bath where the wheel may be spin quenched in a manner similar to heating the wheel as outlined above. Alternatively, the entire wheel may be submerged in the quench bath.

The gas carburizing process involves securing a crane wheel in place in a gas tight box. Air in the box is evacuated and replaced with a carbon rich gas. The box is then heated to roughly about 1650° F. for six to 36 hours, depending on the size of the wheel and the desired case depth. The elevated temperature allows the crane wheel surface to accept carbon from the gas. The wheel obtains a high carbon level on the outside surfaces, including the wear area, which surfaces can then be exposed to a thermal transformation process in order to obtain high surface hardness at the exposed surfaces.

FIGS. 1 and 2 represent prior art crane wheels created according to prior methods such as those just described. As can be observed from the shaded-in portions 39, of the crane wheels 20, the flanges 34, 36 are completely through hardened. As will be further explained below, these through-hardened portions are extremely brittle and subject to possible failure upon adverse impact during use.

SUMMARY OF THE INVENTION

As generally known, to heat treat and harden steel, the material must be heated beyond its critical or transformation temperature. Once past the critical or transformation temperature, the material becomes austenite. A rapid quench of the austenite material creates a hardened material called martensite. Although this hardened material is highly resistant to wear, this hardened material is generally very brittle. As will be further explained below, fully hardened or through hardened flanges of a crane wheel, although somewhat resistant to wear, are typically brittle and subject to possible failure during use in the field.

The prior salt bath process completely through hardens the flange areas of a crane wheel. Meaning, not only are the wear surfaces of the flanges hardened, the entire area of each flange is hardened. As noted, a completely through hardened flange of a crane wheel makes the flange extremely brittle and reduces the overall impact strength of the flange such that the wheel is more susceptible to failure. Thermal cracking frequently occurs in flange areas of a wheel when such flange areas are through hardened. Typically, this results in large portions of the flange area separating from the wheel rendering the wheel inoperable, and creating a dangerous situation where large portions of the wheel may fall on equipment or unsuspecting persons located below an overhead crane.

A phenomenon known as radical cracking occurs when raw material does not meet the material cleanliness specifications when a wheel is formed or when a wheel is unevenly heated during a hardening process. With the large volume of material being hardened in a salt bath process, any slag inclusions in the material or uneven heating within the core of the wheel will create internal stresses that make the wheel prone to radial crack failure. Only a slight deviation from the material cleanliness specification or slightly uneven heating makes a wheel highly susceptible to radial crack failure rendering the salt bath process less than desirable in some instances.

Another problem with the salt bath process is explained with reference to hardening a typical 500-pound crane wheel. To completely transform the wear areas of such a crane wheel using the salt bath method, the wheel must be heated generally for three hours to reach a temperature of around 1650° F. Because of the extensive time needed to reach the transformation temperature, pressures for increased productivity may result in some necessary parts of a crane wheel to not reach the proper transformation temperature. This causes what is generally known as a "butterfly" of soft material in portions of the wheel. This weakens the overall wheel structure and premature field failures may occur.

The prior carburizing process is rarely used today because of the amount of time and degree of temperature needed to obtain hardened surfaces. For example, for a typical 500-pound crane wheel, to completely transform all the wear areas of a crane wheel, the crane wheel must be heated generally for 30 hours to reach a temperature of around 1650–1750° F. This will provide a hardened surface but, for many crane wheels, the case depth is still insufficient to effectively resist wear. As with the salt bath process, and even more so because of the longer periods of heating time, production requirements may result in some crane wheels being heated at improper temperatures for too short of time. This causes shallow and irregular heat patterns which, in turn, provide improper or unsatisfactory wear characteristics. Additionally, another problem with the slow heating process of the carburizing process is that the slow heating process causes heat to migrate into other portions of the wheel causing uneven stresses, distortion and possibly cracking.

What is needed is a wheel that has excellent wear characteristics and toughness. What is also needed is a new process to harden only desired portions of a wheel in an easier and less time consuming manner. What is also needed is a process which provides localized heating to selected portions of a wheel thereby preventing undesired areas of the wheel from heating and eventually hardening. What is further needed is a wheel that is capable of meeting industry standards with respect to wear resistance while at the same time reducing or preventing the problems associated with through hardened flanges.

In one embodiment of the present invention, the radially outer portion includes a hardened portion which includes the wear area and which extends beneath the working tread surface and into the outer flange such that the outer flange is not completely through hardened.

Preferably, the radially outer portion of the wheel includes a second outer flange opposite the first outer flange, the second outer flange including a surface and the wear area including at least a portion of this surface. The hardened portion is of a substantially parabolic shape extending beneath the working tread surface and into portions of each flange such that each flange is not completely through hardened. Further, in the preferred embodiment of the invention, approximately two-thirds to approximately three-fourths of each flange is hardened into a range of, preferably, approximately 58–62 Rockwell-C.

The present invention also includes a method for surface hardening a wear area of a wheel. An induction heater heats the wear area of the wheel while the wheel is rotating about its axis. The temperature of the wear area of the wheel is monitored until such time as the temperature is at least greater than the critical temperature of the wheel. After the critical temperature is reached, the wheel is submerged in a quench bath, preferably, an agitated quench bath. While in the quench bath, the wear area of the wheel is sprayed with a quenching agent. Preferably, the wheel is rotated about its axis while the wheel is submerged in the quench bath.

Preferably, after the wheel has been quenched, the wheel is removed from the quench bath and then the wheel undergoes a tempering process where the wear area is again heated, preferably, with the same induction heat as previously used. During the tempering process, the crane wheel rotates about its axis. As before, the temperature of the wear area is monitored and, once a predetermined temperature is reached, the wheel is cooled in, preferably, the same quench bath as previously used.

Accordingly, it is a feature of the present invention to provide a wheel with improved toughness and wear resistance by selectively hardening wear portions of the wheel.

Another feature of the present invention is to reduce the volume of material transformed in a hardening process for a wheel thereby decreasing the likelihood of the wheel from exhibiting thermal cracking and/or radial crack failure.

Yet another feature of the present invention is to provide hardened wheels which exhibit superior toughness as compared to prior hardened wheels, while at the same time, maintaining a ductile core to improve impact strength, all of which reduces field and manufacturing related failures.

Still another feature of the present invention is to provide a wheel with improved wear characteristics and toughness while reducing production costs and lead time.

A further feature of the present invention is to provide a wheel having a flange which is part of a wear area of the wheel such that the flange is hardened in a way whereby the entire flange area is not completely through hardened.

Yet a further feature of the present invention is to improve the uniformity of case hardness in a wheel thereby providing a more uniform wear surface hardness and more uniform subsurface stresses which lead to uniform compressive stresses which improves the reliable working life of the wheel.

Other features and advantages of the invention will become apparent to those skilled in the art upon review of the following detailed description, claims and drawings.

BRIEF DESCRIPTION OF THE DRAWINGS

FIGS. 6–10 are partial cross-sectional side views of the induction hardening system of FIG. 3 showing, respectively, various positions of the crane wheel with respect to an induction heater and a quench tank as the crane wheel undergoes the induction hardening process according to the present invention.

Figure 1:
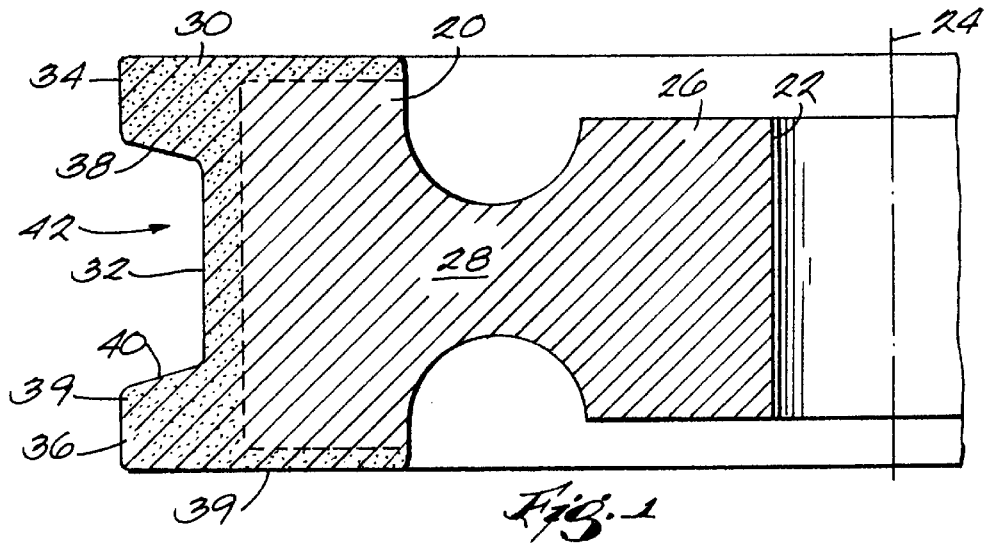
FIGS. 1–2 show respective prior art crane wheels having hardened portions as created by prior art methods.

Before the embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS

Figure 11:
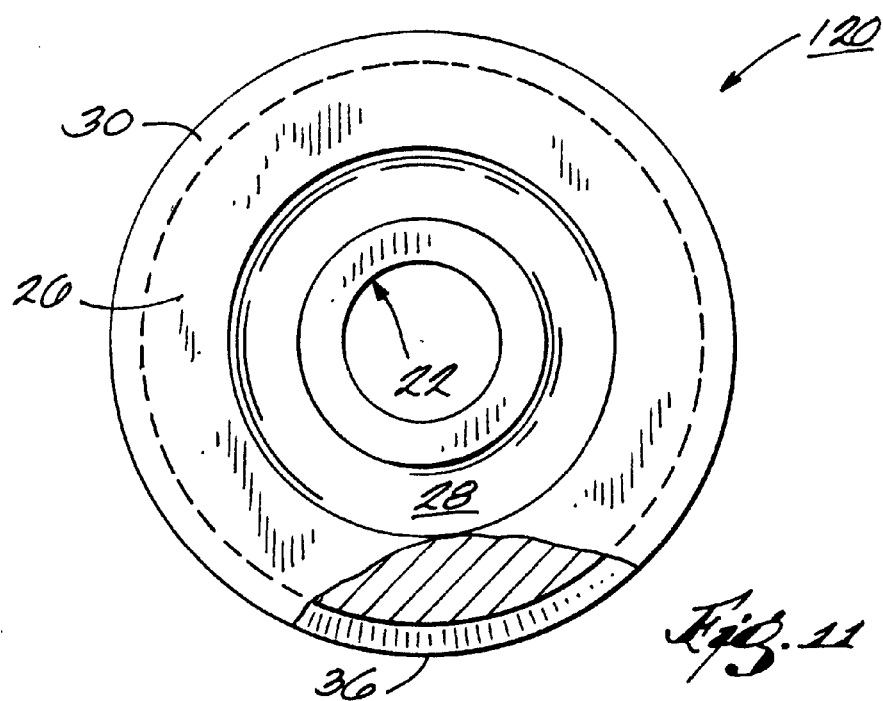
FIG. 11 is a top view of a typical crane wheel subject to a hardening process according to the present invention.
Figure 12:
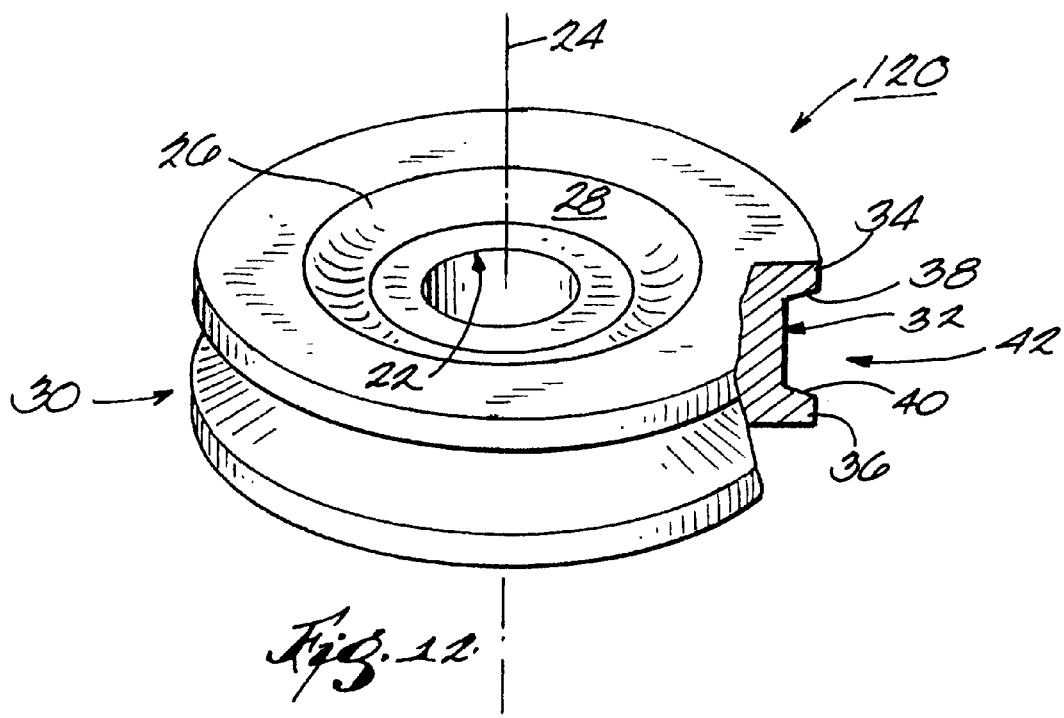
FIG. 12 is a perspective, partially cut away, view of the crane wheel of FIG. 11.

Illustrated in FIGS. 11 and 12 is a typical forged carbon steel crane wheel 120 subject to a hardening process according to the present invention. Except as described below, the parts of the wheel 120 are the same as those of the prior art wheel 20, and common elements have been given the same reference numerals.

As will be apparent, although the crane wheel is shown as having two opposing flanges 34, 36 having substantially the same dimensions, other wheels are capable of benefiting from the principles of the invention described herein. Such wheels may include opposing flanges with one flange being thicker than the other flange; or such wheels may have only a single flange; or such wheels may be flangeless. Also, other non-crane wheels which require hardened surfaces are also capable of benefiting from the principles of the invention described herein. Such wheels may be used in various pulley systems, material handling systems, or even in automobiles or heavy machinery. Additionally, wheels made from all types of metals which require hardened surfaces are capable of benefiting from the principles of the present invention.

Figure 3:
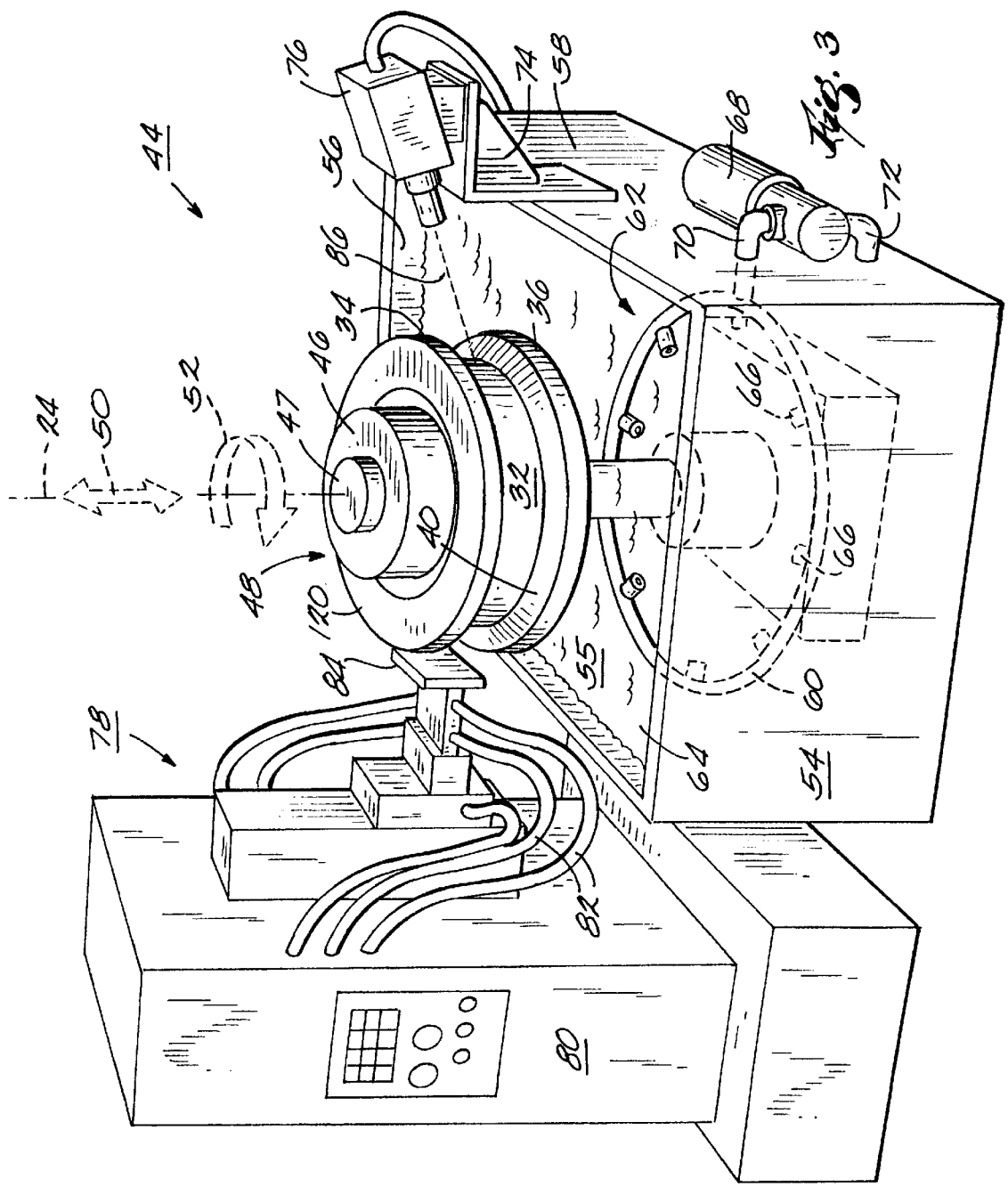
FIG. 3 is an assembly view of an induction hardening system showing a crane wheel positioned to undergo an induction hardening process according to the present invention.

FIG. 3 shows an induction hardening system or facility 44 used for hardening a crane wheel 120 with a hardening process according to the present invention. The crane wheel 120 is secured to a mounting fixture 46 which is part of a retractable rotating (represented by arrows 50, 52) device 48. The device 48 includes a piston rod 47 and device 48 may be a hydraulic lifting mechanism or the like. As shown in FIG. 3, directly below the crane wheel 120, is a quench tank 54 which contains a quenching liquid 55. The quenching liquid 55 is a mixture of water and a quenching agent or product. The quenching liquid 55 generally has about a 90–96 percent water concentration. Although many quenching agents are available on the market, known to those skilled in the art, Quenchant, available from Tenaxol, Inc. of Milwaukee, Wis., and sold under the trademark UCON A registered to Union Carbide, works well with the principles of the present invention.

The quench tank 54 is generally square or rectangular in shape, but can be of many different shapes. The quench tank 54 has an inside wall surface 56 and an outside wall surface 58. A hollow tubular ring 60 (see FIGS. 3–5) is positioned within the interior 62 of quenching tank 54 below the quenching liquid surface 64. The ring 60 may be secured to the interior wall 56 or positioned within the tank 54 in any number of ways, such as, by welding the ring 60 to the inside surface 56 of the tank 54 or by positioning the ring 60 inside the tank 54 through the use of a support structure (not shown). The ring 60 includes circumferentially spaced apart nozzles 66, the function of which will be explained below.

Pump 68 is attached to the outside wall surface 58 of tank 54. Pump 68 includes two pipes 70, 72. One pipe 70 extends through outside wall surface 58 and connects to the hollow ring 60. The other pipe 72 extends through outside wall surface 58 into the quenching liquid 55. The pump 68 circulates the quenching liquid 55 from the quenching tank 54 to the nozzles 66 in the ring 60 such that the quenching liquid 55 is expelled through nozzles 66, the purpose of which will be further explained below.

Bracket mounting fixture 74 (FIG. 3) is attached to the outside wall surface 58 of tank 54. A temperature measuring device 76, such as an infra-red scanner, is secured to bracket 74. The function of temperature measuring device 76 will be explained below. There are many infra-red scanner systems, known to those skilled in the art, capable for use according to the principles of the present invention, but an infra-red scanner sold by Williamson Corporation of Concord, Mass., under the model number 8100LT is particularly well-suited for use with the present invention.

An induction hardening device 78 is located adjacent to quench tank 54. The hardening device 78 includes a control system 80, electrical lines 82, and an induction coil 84. The infra-red scanner 76, pump 68, and retractable rotating device 48 are electrically connected to the control system 80 of the induction hardening device 78. The induction coil 84 is retractably mounted, as represented by arrow 51 shown in FIG. 6, to the hardening device 78. The induction coil 84 is generally made of a single loop square that is capable of heating a wide range of surfaces. The induction coil may be formed to have a radius that matches or substantially matches the radius of the surface to be heated. The induction coil may be made from various sized, single-loop squares, depending on the size and shape of the surface to be heated. Although standard induction coils known to those skilled in the art may be suitable for use according to the present invention, an induction coil according to the present invention sold by Pillar Industries of Menomonee Falls, Wis., is particularly well-suited for the principles of the present invention.

Figure 5:
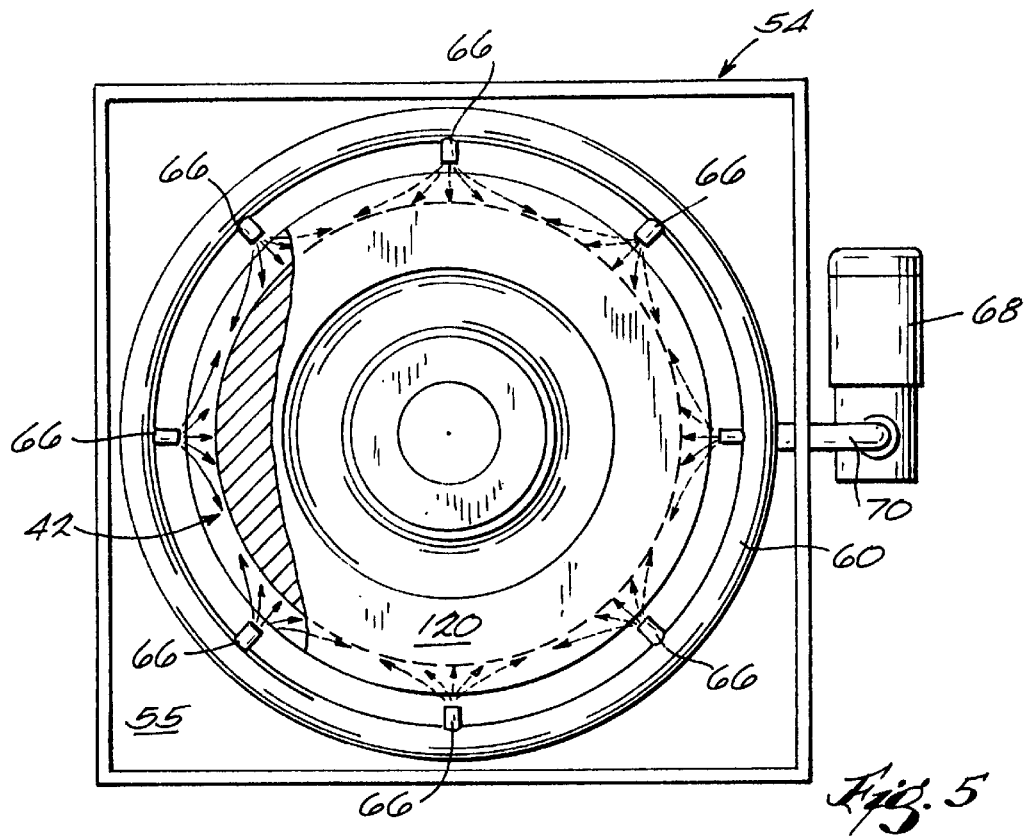
FIG. 5 is a top view of the induction hardening system and crane wheel of FIG. 4.
Figure 4:
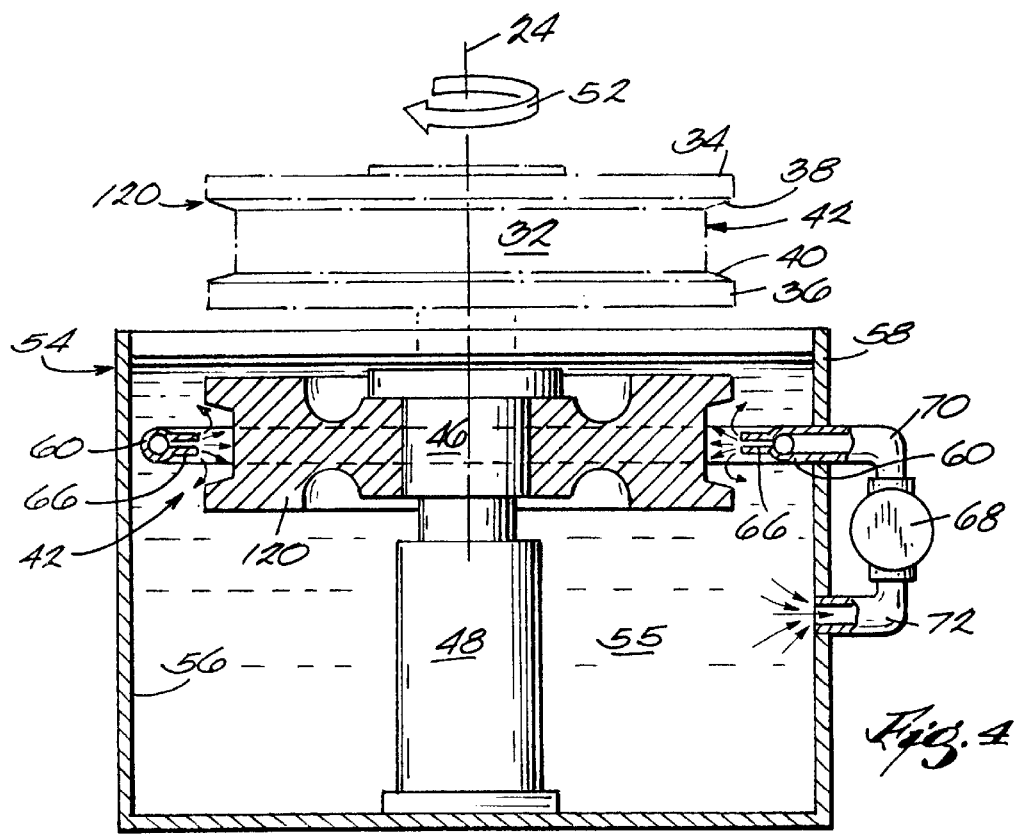
FIG. 4 is a partial perspective side view of the induction hardening system of FIG. 3 showing the relative positions of the crane wheel during certain steps of the induction hardening process according to the present invention.

With reference to FIGS. 3–10, the method according to the present invention will be explained, the method carried out by the induction hardening system 44 of FIG. 3. FIG. 4 shows the crane wheel 120 in two positions. The first or upper position, shown in phantom, is where the crane wheel 120 is originally located with respect to the quench tank 54 and induction coil 84 (see FIG. 6) prior to being submerged in the tank 54. In the second or lower position, the crane wheel 120 is submerged in the tank 54 and the wear area 42 of the crane wheel 120 is sprayed with the quenching liquid 55 via pump 68 as the crane wheel 120 is rotated about its axis. FIG. 5 is a top view of FIG. 4 also showing the wear area 42 of the crane wheel 120 being sprayed with the quenching liquid 55. The process of moving and the purpose for moving the crane wheel 120 from the first position to the second position will be explained in detail with particular reference to FIGS. 6–10, in conjunction with reference to FIGS. 3–4.

FIG. 6 shows crane wheel 120 in the upper position or in an uppermost location as determined by device 48. induction coil 84 is shown retracted from the wheel 120. FIG. 6 represents the location of the referenced parts prior to the beginning of the hardening process.

FIG. 7 shows the wear area 42 of the crane wheel 120 being heated. Induction coil 84 is positioned relative to the wear area 42 to heat the wear area 42. The partially shaded portion 43 represents that part of the wheel 120 being heated by the induction coil 84. Wheel 120 rotates about its axis 24, represented by arrow 52, preferably at approximately 60 revolutions per minute, as the induction coil 84 heats the wear area 42. The induction coil 84 creates a hot spot in the wheel 120 under the induction coil 84. Spinning the crane wheel 120 past the induction coil 84 continuously moves the hot spot under the coil 84 around the working tread surface 32. This allows the heat to conduct into the wheel 120 and heats more metal, allowing for more complete metal transformation and produces a more uniform heating. Spin hardening the wheel 120 helps ensure that the surfaces 32, 38, 40 of the wear area 42 receive approximately the same amount of heat in the same amount of time. This produces a more uniform hardened surface as compared to prior methods, thereby producing a hardened surface better suited for uniform wear and, thereby, also reducing subsurface stresses which, if present, increase the likelihood of a wheel failing in the field. In sum, the method of heating the wear area 42 according to the present invention creates a uniform case hardness which results in uniform wheel wear during use and produces uniform compressive stresses to increase the strength and toughness of the wheel.

Preferably, the induction coil 84 is located approximately one-quarter of an inch from the working tread surface 32 during the heating of the wear area 42. The width of the induction coil 84 is generally ¼–¾ of an inch smaller than the width of the working tread surface 32. If the wheel 120 has two substantially the same opposing flanges 34, 36, the induction coil 84 is typically centered between the flanges. If the wheel has one flange thicker than the other, the induction coil is generally located closer to the thicker flange than the thinner flange. In this way, the right amount of heat can be transferred to the appropriate surfaces of a wheel.

With reference to FIG. 3, the infra-red scanner 76 monitors the temperature of the wear area 42 as the wheel 120 is being heated as shown in FIG. 7. The eye of the scanner 76, represented by line 86 in FIG. 3, is preferably aimed at the middle of the working tread surface 32. This is important because the largest case depth is required in the working tread surface 32 as a result of this surface always being in contact with a rail and subjected to most of the load during operation, which means more metal must undergo transformation for hardening in the tread surface 32 than the flanges 34, 36. Thus, measuring the temperature of the working tread surface 32 will help ensure that the heating step continues until the critical temperature is reached in the working tread surface.

The heating of the crane wheel 120 is controlled by temperature rather than by time. Time control would be acceptable if the same type and size of wheel were heated multiple times. However, since the crane industry provides wheels of infinite variability, time control is not the preferred control measure. Temperature control allows for a repeatable process for a highly variable product. The use of an infra-red scanner provides excellent accuracy and repeatability in a temperature controlled process.

With reference to FIG. 8, after the temperature of the working tread surface 32 reaches its critical temperature, the infra-red scanner 76 sends a signal to the induction hardening system 44 or controller 80 to retract the induction coil 84. It should be noted that the power required by the induction coil 84 to heat the wear area past its critical temperature will vary depending on the size of the wheel being heated. However, the power will typically fall in the range of 150 kilowatts to 450 kilowatts. The controller 80 also informs the retractable device 48 to lower the wheel 120 into the quench bath 55. Preferably, the wheel 120 is continually rotated about its axis 24 from the beginning of the heating stage and during the quenching stage. The wheel 120 is preferably rotated as it enters the quench bath 55 to assist in providing an agitated quench. As can be appreciated by those skilled in the art, the area of a heated part that first hits a quench will be the first to harden. The agitated quench according to the present invention assists in hardening substantially all of the relevant areas of the crane wheel at the same time thereby creating a more uniform hardened area which results in all of the benefits previously set forth.

With reference to FIG. 4, to further increase the speed of the quenching process and provide even more uniform hardening, the wear area 42 of the crane wheel 120 is sprayed with the quenching agent 55 by nozzles 66 connected to pump 68. The agitated quench bath 55 and the spraying of the quenching liquid 55 on the wear area 42 optimizes the quenching process by removing the vapor blanket created on the wear area 42 of the wheel 120 during the heating process as quickly as possible to create a more uniform hardened surface. Preferably, the quench tank 54 is directly below the crane wheel 120 as the crane wheel 120 is being heated so that once the part is ready to be quenched, it can be delivered as quickly as possible to the quenching tank 54. The retractable rotating device 48 ensures a quick transfer from the first heating position to the second quenching position.

As noted, preferably, the quench system is an aggressive system which utilizes directional flows of quenchant 55 supplied by the nozzles 66 submerged in the quench bath 55. The nozzles 66 provide a high pressure quench 55 to the wear areas 42 of the wheel 120. This allows for the heat to be quickly drawn away from deep inside the wear area 42 to provide a more uniform hardened surface. A quench bath 55 that does not forcibly apply quench may result in lower case depths and uneven hardening.

After a predetermined time, usually 150 seconds to 400 seconds, depending on the size of the wheel, the wheel 120 is removed from the quench bath 55. The controller 80 sends a command to device 48 to lift wheel 120 out of the quench bath 55. Preferably, the wheel 120 will then proceed to undergo a tempering process. With reference to FIG. 9, after the retractable rotating device 48 lifts the crane wheel 120 out of the quench tank 54, the induction coil 84 is positioned once again near the wear area 42 to heat the wear area 42 of the crane wheel 120. As during the heating step of FIG. 6, the wheel 120 rotates about its axis 24. Tempering is preferred because, as can be appreciated by those skilled in the art, it helps prevent the working tread surface 32 and flange surfaces 38, 40 from cracking. The temper process changes the surfaces from strictly martensite to finely divided ferrite and carbite. This slightly softens the surfaces of the wear area 42 to help reduce wear and pitting. Preferably, the tempering process is performed on the induction system 44 with the same equipment used for the heating process of FIG. 6. Meaning, the same induction coil 84 and other equipment is used.

The infra-red scanner 76 monitors the temperature of the crane wheel wear area 42 and once a predetermined temper temperature is reached, usually 300–350° F., the scanner 76 sends a signal to the controller 80 to retract the induction coil 84 and informs the retractable device 48 to lower the wheel 120 into the quench tank 54 for cooling, as shown in FIG. 10. Preferably, the wheel 120 is rotated about its axis 24 during the cooling step and the wheel wear area 42 is sprayed with the quenching liquid 55. The power required by the induction coil 84 to temper wheel 120 is considerably less than the power to heat wheel 120 to its critical temperature, usually, in the range of 50 kilowatts to 200 kilowatts, depending on the size of the wheel.

To provide a wheel according to the present invention and increase productivity, it is preferred that the wheel be supported by the retractable rotating device 48 during the entire process as shown from the beginning in FIG. 3 through the end of the process as represented by FIG. 10.

As compared to the prior salt bath process and carburizing process described herein, a typical 500-pound crane wheel is capable of being hardened according to the present invention in considerably less time and with lower temperatures than used by the prior processes. Because the process according to the present invention provides localized heating as described above, a 500-pound wheel is capable of being hardened at about 1500° F. in about 15 minutes.

Figure 13:
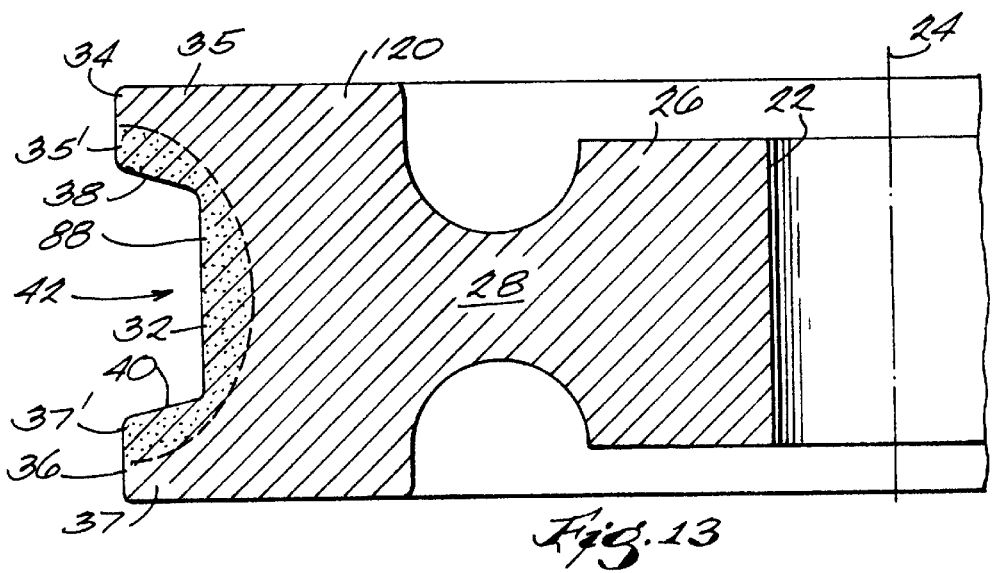
FIG. 13 shows a crane wheel with a hardened portion according to the present invention.

The method of the present invention is designed to create a crane wheel 120 with a hardened portion as shown in FIG. 13. The slightly shaded portion shown in FIG. 13 represents a hardened portion 88 of a crane wheel 120 according to the method of the present invention. The hardened portion 88 includes the wear area 42 of the crane wheel 120 and extends beneath the working tread surface 32 and into the outer flanges 34, 36 such that the outer flanges 34, 36 are not completely through hardened.

As can be observed in FIG. 13, portions 35, 37 of the flanges 34, 36, respectively, remain ductile or as forged as does the body 28 of wheel 120. These as forged portions 35, 37 increase the impact strength of the flanges 34, 36 of the crane wheel 120. Moreover, partially hardening the flanges 34, 36 results in providing compressive stresses in the wheel 120 at the location where the as forged ductile material of the wheel 120 ends and the hardened portion 88 begins. These compressive stresses greatly improve the strength characteristics of the wheel 120.

Figure 2:
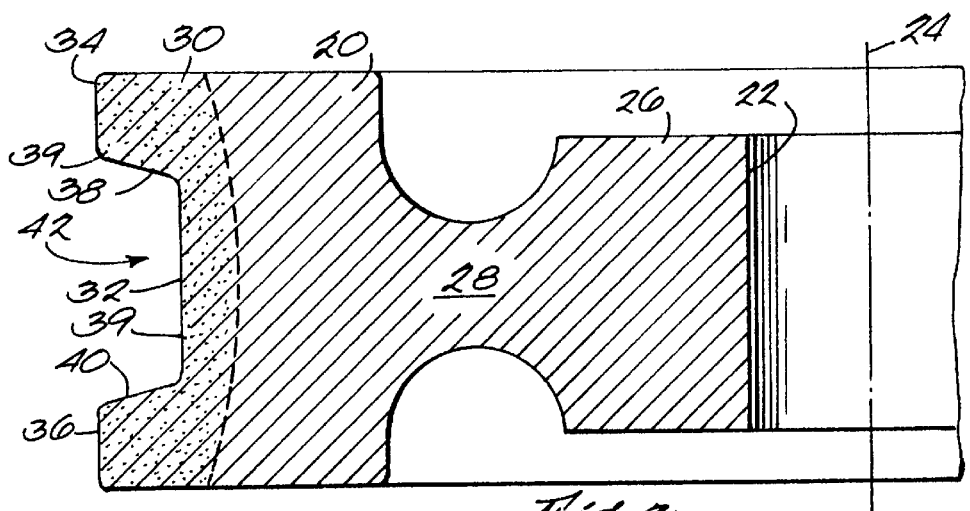

As shown in FIG. 13, the hardened portion 88 is of a substantially parabolic shape extending beneath the working tread surface 32 and into portions 35', 37' of each flange 34, 36, respectively, such that each flange 34, 36 is not completely through hardened. As can be observed, the heat treat case depth is greatest at the center of the working tread surface 32 and tapers off towards the wheel flanges 34, 36. The required heat treat depth is assured at the inside of the wheel flange 34, 36 and at the center of the working tread surface 32, not at and around the outer portions 35 and 37 of flanges 34, 36. According to the subject invention, flange through hardening, like that shown in FIGS. 1 and 2, is not acceptable. For those crane wheels that utilize a single flange, a partial parabolic shape would be formed. The hardened portion would extend beneath the working tread surface as shown in FIG. 13 and into the single flange as if only a single flange was shown in FIG. 13. For those wheels that do not have any flanges, the hardened portion would represent yet a smaller partial parabolic shape, such as a bowl, beneath the working tread surface.

Preferably, approximately two-thirds to approximately three-fourths of each flange 34, 36 is hardened. The overall hardened portion is preferably hardened to a range of 58–62 Rockwell-C.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A method for surface hardening a wear area of a wheel having an axis of rotation and a critical temperature, said method comprising the steps of:

heating the wear area of the wheel with an induction heater while rotating the wheel about its axis;

monitoring temperature of the wear area of the wheel until such time as said temperature is at least greater than the critical temperature;

submerging the wheel in a quench bath after said temperature is at least greater than the critical temperature; and spraying the wear area of the wheel with a quenching agent.

2. A method according to claim 1, further comprising the step of rotating the wheel about its axis while the wheel is submerged in said quench bath.

3. A method according to claim 2, further comprising the steps of:

removing the wheel from said quench bath;

tempering the wear area of the wheel with an induction heater while rotating the crane wheel about its axis;

monitoring said temperature of the wear area of the wheel while the wheel is being tempered; and cooling the wheel in said quench bath after the wear area has reached a predetermined temperature.

4. A method according to claim 3, further comprising the step of rotating the wheel about its axis during said cooling step.

5. A method according to claim 4, further comprising the step of spraying the wear area of the wheel with a quenching agent during said cooling step.

6. A method according to claim 3, wherein during said heating step and said tempering step, a single induction heater is used.

7. A method according to claim 3, wherein after said cooling step, the wheel is under compressive stress.

8. A method according to claim 3, wherein during the entire process, the wheel is supported by a single device.

9. A method according to claim 8, wherein said quench bath is located directly below the wheel as the wheel is being heated.

10. A method according to claim 1, wherein said step of monitoring said temperature of the wear area of the wheel includes the use of an infra-red camera.

11. A method according to claim 1, wherein the wheel is supported by a single device throughout the entire process.

12. A method according to claim 11, wherein said quench bath is located directly below the wheel as the wheel is being heated.

13. A method according to claim 1, wherein during said heating step, the wheel is rotated about its axis at approximately 60 revolutions per minute.

14. A method according to claim 1, wherein after said spraying step, the wheel includes a hardened portion of approximately 58–62 Rockwell-C.

15. A method according to claim 3, wherein after said cooling step, the wheel includes a hardened portion of approximately 58–62 Rockwell-C.

16. A method according to claim 14, wherein the wheel further includes:

a radially inner portion including the axis of rotation; and a radially outer portion including a working tread surface and an outer flange, said outer flange having a surface, said radially outer portion including the wear area which includes said working tread surface and at least a portion of said surface of said outer flange, and said radially outer portion including said hardened portion, said hardened portion including the wear area, said hardened portion extending beneath said working tread surface and extending into said outer flange such that said outer flange is not completely through hardened.

17. A method according to claim 16, wherein approximately two-thirds of said flange is hardened.

18. A method according to claim 16, wherein three-fourths of said flange is hardened.

19. A method according to claim 16, wherein said radially outer portion includes a second outer flange opposite said first outer flange, said second outer flange having a surface and the wear area further includes at least a portion of said surface of said second outer flange, and wherein said hardened portion is of a substantially parabolic shape extending beneath said working tread surface and into portions of each flange such that each flange is not completely through hardened.

20. A method according to claim 19, wherein approximately two-thirds of each flange is hardened.

21. A method according to claim 19, wherein approximately three-fourths of each flange is hardened.

22. A method according to claim 16, wherein during said heating step, said induction heater is located approximately one-quarter of an inch from said tread surface of the wear area.

23. A method according to claim 19, wherein during said heating step, said induction heater is located approximately one-quarter of an inch from said tread surface of the wear area and said induction heater is approximately centrally located between said opposite outer flanges.

24. A method according to claim 19, wherein one outer flange is wider than said other outer flange and, wherein during said heating step said induction heater is located closer to said wider outer flange than said narrower outer flange.

25. A method for surface hardening a wear area of a wheel having an axis of rotation and a critical temperature, said method comprising the steps of:

heating the wear area of the wheel with an induction heater while rotating the wheel about its axis;

monitoring temperature of the wear area of the wheel with an infra-red camera until such time as said temperature is at least greater than the critical temperature;

quenching the wheel in a quench bath after said temperature is at least greater than the critical temperature, said quench bath being located directly below the wheel as the wheel is being heated;

rotating the wheel about its axis while the wheel is submerged in said quench bath;

spraying the wheel with a quenching agent;

removing the wheel from said quench bath;

tempering the wheel with said induction heater while rotating the wheel about its axis;

monitoring said temperature of the wear area of the wheel as the wheel is being tempered;

cooling the wheel in said quench bath after the wear area has reached a predetermined temperature;

hardening the wheel wear area;

creating a hardened portion which includes the wear area of the wheel, said hardened portion having a hardness in a range of approximately 58–62 Rockwell-C; and supporting the crane wheel with a single device during the entire process.

26. A method according to claim 25, further comprising the steps of:

rotating the wheel about its axis during said cooling step; and spraying the wear area of the wheel with a quenching agent during the cooling step.

27. A method according to claim 25, wherein the wheel further includes:

a radially inner portion including the axis of rotation; and a radially outer portion including a working tread surface and an outer flange, said outer flange having a surface, said radially outer portion including the wear area which includes said working tread surface and at least a portion of said surface of said outer flange, and said radially outer portion including said hardened portion, said hardened portion including the wear area, said hardened portion extending beneath said working tread surface and extending into said outer flange such that said outer flange is not completely through hardened.

28. A method according to claim 27, wherein said radially outer portion includes a second outer flange opposite said first outer flange and wherein said hardened portion is of a substantially parabolic shape extending beneath said working tread surface and into portions of each flange such that each flange is not completely through hardened.

29. A method according to claim 28, wherein the wheel is a crane wheel for rolling along a rail surface.

* * * * *